United States Patent [19]

Everett, Jr.

[11] 4,282,522
[45] Aug. 4, 1981

[54] DISPLAY/MEMORY/CONTROL SYSTEM FOR FORWARD OBSERVER SOURCE DATA

[75] Inventor: Seth L. Everett, Jr., Lincroft, N.J.

[73] Assignee: The United States of America as represented by the Secretary of the Army, Washington, D.C.

[21] Appl. No.: 8,677

[22] Filed: Feb. 2, 1979

Related U.S. Application Data

[63] Continuation of Ser. No. 761,145, Jan. 21, 1977, abandoned.

[51] Int. Cl.³ .............................................. G08B 5/36
[52] U.S. Cl. ........................................ 340/711; 40/471; 340/378.5; 340/809; 340/799; 353/26 R; 353/26 A; 434/11; 434/362; 434/426
[58] Field of Search ............... 340/706, 711, 712, 806, 340/809, 810, 378.4, 378.5; 35/9 A; 40/471; 353/26 R, 26 A

[56] References Cited

U.S. PATENT DOCUMENTS

| | | |
|---|---|---|
| 2,965,727 | 12/1960 | Passman ........................... 340/809 X |
| 3,047,852 | 7/1962 | Smith ................................... 340/810 |
| 3,290,987 | 12/1966 | James et al. ...................... 353/26 R |
| 3,292,489 | 12/1966 | Johnson et al. .................. 340/712 X |
| 3,355,819 | 12/1967 | Hannah et al. ........................ 35/9 A |
| 3,485,946 | 12/1969 | Jackson et al. ........................ 358/93 |
| 3,538,313 | 11/1970 | Thomas et al. .................... 353/26 A |
| 3,582,937 | 6/1971 | Dozer et al. ...................... 40/471 X |
| 3,608,208 | 9/1971 | Willardson ............................ 35/9 A |
| 3,654,708 | 4/1972 | Brudner ................................ 35/9 A |
| 3,744,890 | 7/1973 | Suzuki et al. ..................... 353/26 R |
| 3,885,866 | 5/1975 | Stearns .............................. 353/26 A |
| 3,987,484 | 10/1976 | Bosche et al. ....................... 35/24 R |
| 3,992,092 | 11/1976 | Place .................................... 35/9 A |
| 4,001,776 | 1/1977 | Carol et al. ...................... 340/378 R |
| 4,026,053 | 5/1977 | Canon ................................ 40/471 X |
| 4,055,906 | 11/1977 | Thompson ............................ 35/9 A |

*Primary Examiner*—David L. Trafton
*Attorney, Agent, or Firm*—Nathan Edelberg; Jeremiah G. Murray; Edward Goldberg

[57] ABSTRACT

A control system utilizing prerecorded photographic film in a miniature message terminal device as both a display and memory medium for applications requiring interactive operator processing of rigidly structured messages, and particularly, from lists of allowable multiple choice entries.

5 Claims, 4 Drawing Figures

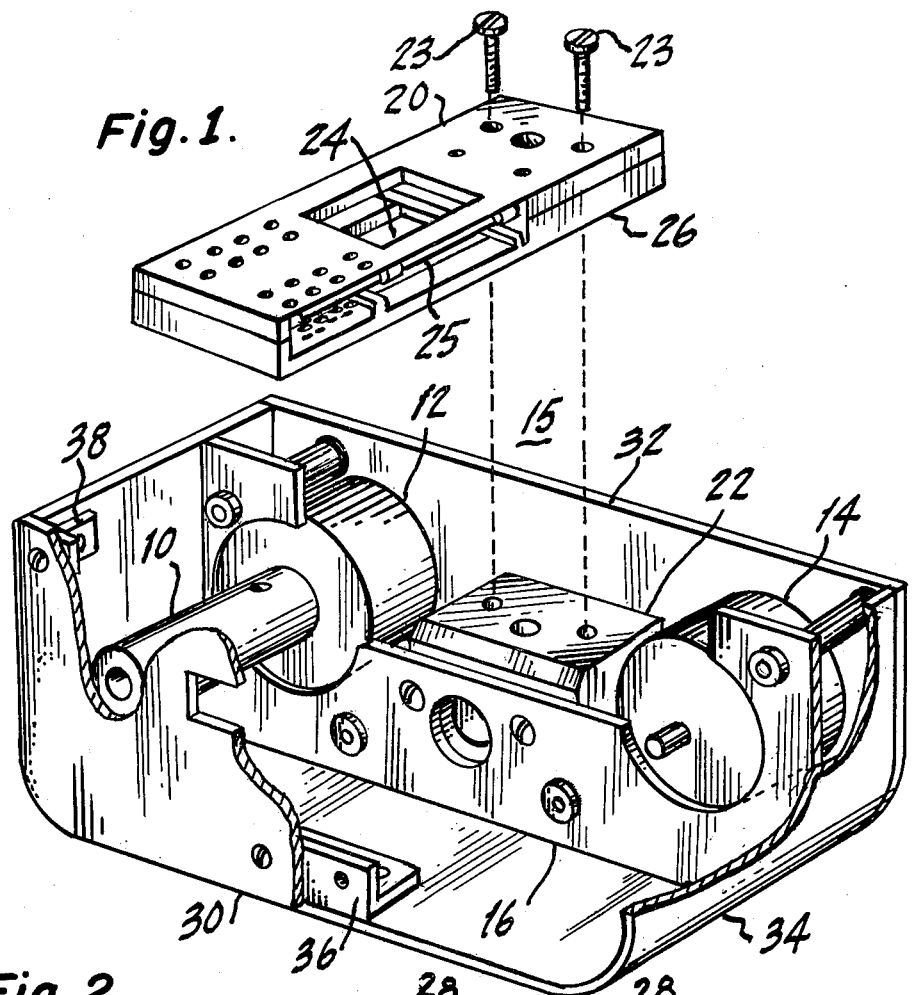
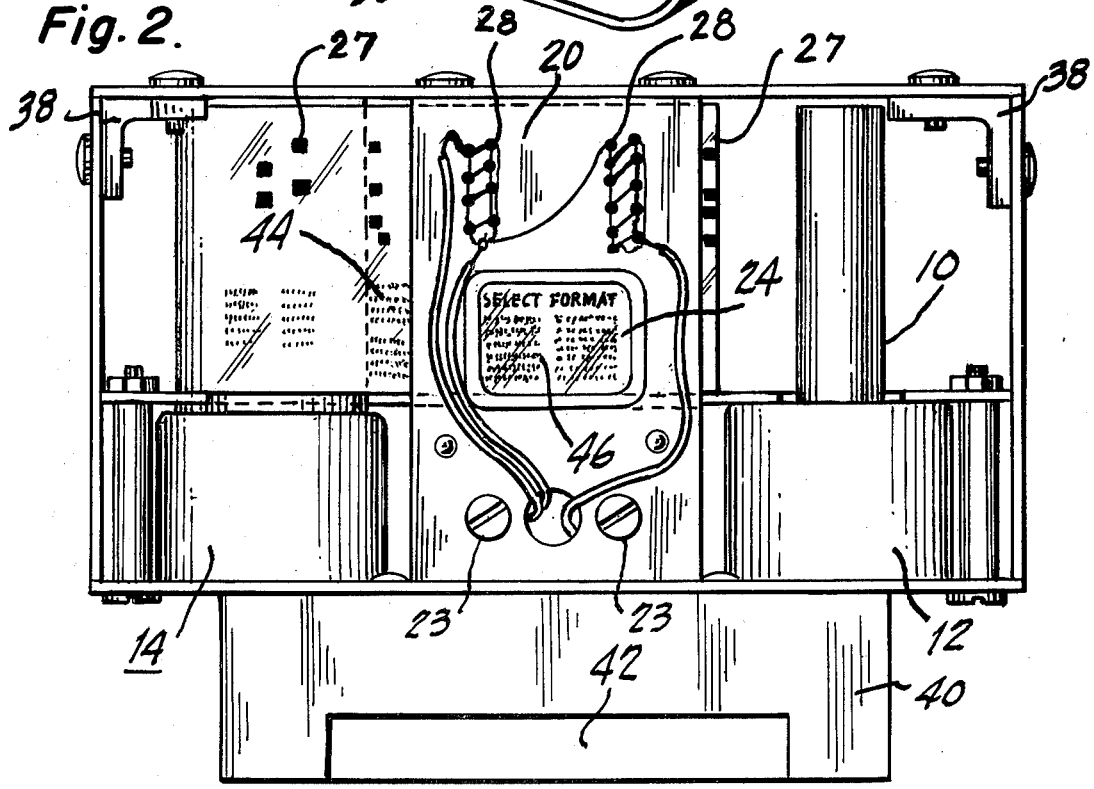

DISPLAY/MEMORY/CONTROL SYSTEM FOR FORWARD OBSERVER SOURCE DATA

The invention described herein may be manufactured and used by or for the Government for governmental purposes without the payment of any royalties thereon or therefor.

This is a continuation, of application Ser. No. 761,145, filed Jan. 21, 1977, now abandoned.

FIELD OF THE INVENTION

This invention relates to handheld message terminals for use by forward observer personnel in a diversity of military field applications, and, more particularly, to a control system constructed so as to permit a forward observer operator to directly view applicable portions of a prerecorded photographic filmstrip on which multiple choice selections for entry are directly displayed.

BACKGROUND OF THE INVENTION

As is well known and understood, there exists a need for a handheld message entry terminal for use by a forward military observer to enter short messages into a computer based system for analysis. For example, a forward observer may be called upon to transmit, in digital format, various informations concerning the terrain in an area under his surveillance so that troop movements may be planned aforehand. In typical applications, the forward observer may be called upon to transmit information describing natural terrain—the location of a cave, a lake, a river, or a ridge, etc.—, man-made terrain—the location of a cemetery, a road, a railroad crossing, for example —, the existence of fortifications—e.g., an airfield, a permanent building, a gun emplacement, a landing strip, a trench—, or the existence of obstacles to troop movement—amongst which might be the presence of barbed wire, minefield, a crater, or a roadblock.

Such message terminals as have existed heretofore for use by a forward observer have not provided optimum performance capabilities. The well known "walkie-talkie", for example, requires conversion of the audio information into digital form for use by the computer based system, and suffers the further disadvantage that its use is not limited to the rigid message information format readily accepted as one of the most efficient means of communications in a coded communications network. Attempts at utilizing digital signals for coded transmission in accordance with formats set down in code books suffer the disadvantage that the books can be lost or can be damaged by inclement weather, and suffer the added disadvantage that the code books can be used at night only after first being illuminated, thereby providing a means of announcement of one's presence in an area and damaging security. Whereas the conversion to light emitting diode or plasma panel displays have obviated the problems attendant with these code books, there is associated with them both a complexity of design and an associated high cost. Additionally, the large amount of power needed to operate these devices during daylight conditions has resulted in these message systems being both bulky and unmanageably heavy for effective forward operator use, weighing in the order of 10-12 pounds, and more.

SUMMARY OF THE INVENTION

As will become clear hereinafter, the display/memory/control system of the present invention employs prerecorded photographic film as both a display and memory medium. The film is directly viewed through a window, with appropriate magnification if desired, and is viewable during daylight without the need for energy or power to provide display illumination. An electroluminescent panel provides low level back lighting of the display area for viewing in darkness, with the energy for this back lighting being provided by means of a power source located within the message terminal to which the display/memory/control system is interconnected. In accordance with the invention, the prerecorded filmstrip is optically coded so as to provide sequencing information to the microprocessor terminal, to govern the movement of the film to an appropriate frame for interrogation. The frame then presents alphanumeric information in the form of multiple choice entries for selection by the forward operator using the device. As will be seen, a pair of stepping motors constitute the only moving parts of the system which therefore avoids the need for brushes or gears that tend to cause audible or electrical noise. With the simplified display provided and with the much less stringent requirements of illumination associated therewith, the display of the invention not only can cost an order of magnitude less than that of the previous electronic versions, but can weigh in the order to less than two pounds, for easy carrying.

BRIEF DESCRIPTION OF THE DRAWINGS

These and other features of the present invention will be more clearly understood from a consideration of the following description taken in connection with the accompanying drawings, in which:

FIG. 1 shows a cut-away assembly view of the display film loader constructed in accordance with the invention;

FIG. 2 shows the display loader encased in a housing, but with the front surface removed to more easily visualize one frame of film display;

DETAILED DESCRIPTION OF THE DRAWINGS

Figure 3:
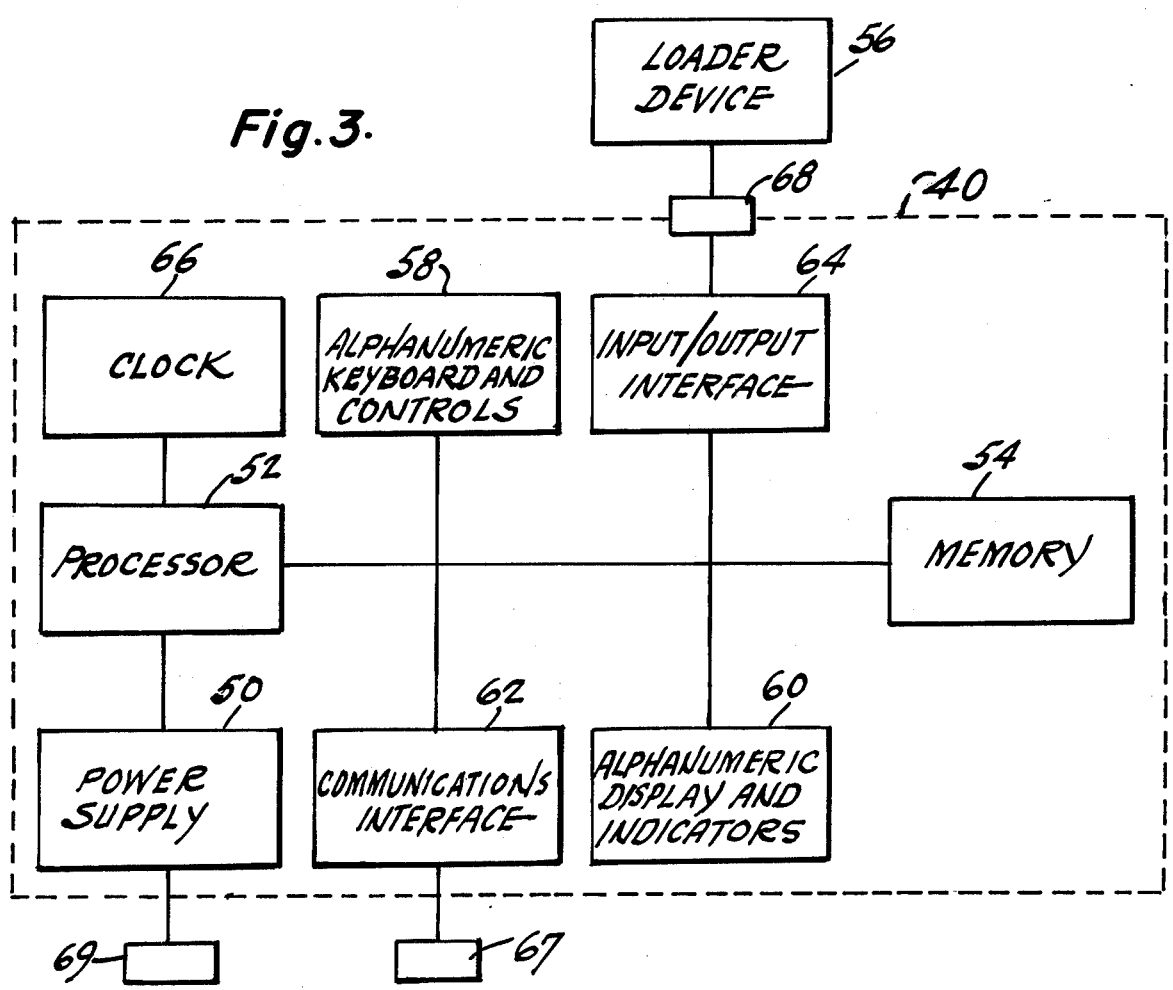
FIG. 3 is a block diagram of a microprocessor message terminal helpful in an understanding of the present invention.

Before describing in detail the display/memory/circuit system utilizing the prerecorded photographic film, it might be helpful to briefly describe a simplified manner by which a handheld message terminal might be used in a military field application. A forward observer having one of these message terminals has available to him a plurality of information formats which he can select for the transmission of data information to the central base computer. Thus, he might wish to provide information as to an activity which he sees in an area which he is monitoring ("spotting"), might wish to provide information as to a request for urgently needed artillery support ("fire request quick"), or might just wish to provide information to the computer base as to his position in the field ("observer location"). Each of these formats, as well as some 13 others, may be available for multiple choice selection by the observer by pressing an appropriate coded key on an alphanumeric keyboard on his message terminal device, the letter "A", for example, identifying the "fire request quick" format, the letter "F" identifying the "spotting" format and the letter "O" representing the "observer location" format. Each of these formats may be identified on a single frame of the prerecorded photographic film in abbreviated form of 8 characters, or less, on a 16 format multiple choice frame (FIG. 2). When the selection is made, e.g., the key "F" is depressed for "spotting" information to be provided to the computer, the word "spotting" appears on an alphanumeric display of the handheld device to verify to the operator that he is in the desired transmission mode.

When the selection is made, a memory in the handheld message terminal device is activated, to controllably sequence the various frames of photographically recorded information past a viewing window in accordance with the format selected. In accordance with the invention, all frames of information content are prerecorded on the photographic film in predetermined locations, to be selectively brought into viewing by the memory control. Thus, after a format such as "spotting" has been selected, the memory operates to bring one prerecorded frame into view—for example, to display a question as to the direction of the item observed, the answer to which (either by multiple choice selection or by information insertion) is inserted into the memory of the message terminal by the operator depressing the appropriate coded key on the alphanumeric keyboard, the answer being simultaneously displayed on the alphanumeric display. Thereupon, the memory of the message terminal device automatically sequences the photographic film to the next frame of information required by the format selected—for example, the time of day, the distance to the object observed, the type of object, etc. After each selection is made, or question is answered to, the selection, or answer, is stored in a second memory of the message terminal device for subsequent transmission, and the photographic film is once again sequenced to the next frame for information required, in accordance with the coded format selected. At the conclusion of the individual frame viewings, and individual alphanumeric keyboard insertions of the answers provided, the message terminal device is activated to transmit all the stored informations to the central computer—and, as a short digital burst in a predetermined sequence which the computer is conditioned to understand. Upon receipt at the central station, the computer could send an "acknowledgement" signal to the forward operator to indicate that the message has been received—with the signal being sent by the computer being coded so as to activate only the message terminal device of the forward operator then providing the "spotting" information, he, being the intended recipient of the "acknowledgement" message.

(In each of these instances, it will be understood that when the operator depresses the keys on the alphanumeric keyboard of the microprocessor message terminal to insert the information required for the message frame display, that information which is inserted by the selection will simultaneously appear on its alphanumeric display for verification.)

Referring now to FIG. 1, one embodiment of the display film loader according to the invention, it will be understood that the recording medium comprises a 35 mm film cassette which is prerecorded in accordance with the application for which it is intended. (As will be readily apparent, many military applications are envisionable; one in which the invention serves particularly well is the Tactical Artillery Fire Control System [TACFIRE], in which the observer is physically located in a forward position, i.e. close proximity to the enemy, in a severe tactical environment.) The loader 15 generally consists of this photographic filmstrip, a compact photographic film transport with integral optical readers, a backlighted display window for direct viewing of applicable portions of the filmstrip, a chassis structure and associated electronic circuitry. The photographic film cassette may hold approximately 26 feet of 35 mm standard film stock (e.g. Eastment Kodak Panatomic X Aerial Film), designed to fit around a shaft extension 10 of a first motor 12 and to be drawn between that shaft extension 10 and another one extending in a similar direction (not shown) of a second motor 14. Reference numeral 16 represents a mounting plate for the motors 12 and 14, with the motors 12, 14, being stepping motors capable of moving the film thereacross at a rate of 18 inches per second. For one direction, motor 12 is driven and motor 14 provides a "drag", while for reverse direction, motor 14 is driven and motor 12 provides the "drag". The film cassette may be of any appropriate design, such as employing a pair of idler wheels and hubs to which the ends of the filmstrip are securely fastened.

A light emitter and display aperture assembly 20 is shown securable to a light emitter/light sensor assembly bracket 22 by means of a pair of screws 23, for example, and is oriented such that the filmstrip passes through a slot 25 thereof, with individual frames being viewable through a display window 24. Shown as part of aperture assembly 20 is a light sensor and electroluminescent panel assembly 26, with the light sensor portion thereof being used to detect, in part, prerecorded coded portions 27 on the filmstrip to ensure that a film frame is correctly positioned within the window 24. For example, each frame of the filmstrip may be physically coded both at the beginnings and ends thereof, to the extent that when the light emitters of assembly 20 and light sensors 28 of assembly 26 cooperate to detect the presence of the same code at opposite sides of a frame as the film moves along the sensors, then a signal is directed to stop the motor rotation and film, assuring the positioning of the information frame at the window 24. Reference numeral 30 in FIG. 1 represents a housing plate at the film side of the display loader 15, reference numeral 32 represents a housing plate at the motor side of the loader 15, reference numeral 34 represents a plate at the bottom and sides of the display loader, and reference numerals 36, 38 represent brackets in holding the various plates together.

In one embodiment of the present invention, no optics or illumination was required for viewing the filmstrip under daylight, or high ambient lighting conditions. The prerecorded characters imprinted onto the film stock were selected approximately $\frac{1}{8}$" high, and a small magnifying lens was employed to overlie the display window 24. Direct viewing at nighttime or under low ambient lighting conditions was made possible through the use of electroluminescent panel (not shown) in assembly 26, on which the back side of the displayed film frame was caused to rest. Energization for the electroluminescent panel was provided through an interface coupling between the display loader 15 and the microprocessor message terminal (indicated by the reference numeral 40 in FIG. 2). The alphanumeric display of the microprocessor message terminal 40 is shown at 42, along with the motors 12, 14, the filmstrip 44, the light emitter assembly 20, and one frame of message format 46 in the window aperture 24. The abbreviated, multiple choice formats shown have meaning to the forward operator, who selects the appropriate one for transmitting information to the computer by depressing a key or keys on the alphanumeric keyboard (not shown) of microprocessor 40.

The microprocessor message terminal 40 of FIG. 3 incorporates a power supply 50 to provide the appropriate operating voltage/power levels for all the microprocessor subsystems. The computerized processor itself is shown at 52, along with a memory unit 54 which stores both program and data information, transferred, under processor control, from the display film loader device 56. The alphanumeric keyboard and controls unit 58 provides for the manual input of data, and can be illuminated so as to permit its use under ambient lighting conditions ranging from bright daylight to total darkness. The alphanumeric display and indicators unit 60 provides a visual presentation of upper case alphanumeric characters, with a brightness controlled so as to permit its use under ambient lighting conditions also ranging from daylight to darkness. The communications interface unit 62 is employed to convert digital information to be sent from the memory 54 to the central computer into appropriate signal levels and modulation forms. Similarly, the unit 62 converts all signals received from the computer center into digital levels appropriate for transfer to the subsystems of the handheld microprocessor device. The input/output interface unit 64 provides for signal interconnections between the processor 52 and the loader device 56 through line drivers, receivers, etc., and is designed to permit signal information to be transmitted from one device to the other in either direction. A clock 66 provides the timing necessary for the microprocessor controls. The communications interface connection to the computer is shown at 67, the input/output interface connection between the devices 40 and 56 is shown at 68, and an external power source, if utilized, is coupled by way of a power connection 69.

In the loader device 56, on the other hand, (FIG. 4) the input/output connection 68 from the microprocessor device 40 couples to a control unit 72 which responds to processor requests to provide the overall transfer of information to the microprocessor memory 54. The transport drive section 74 responds to an output signal from the control 72 to activate the stepping motors in moving the photographic film in a display/store unit 76 so as to provide for visual presentations of the prerecorded photographic frames of alphanumeric characters and symbols. As was previously mentioned, such film can be illuminated through electroluminescent back lighting so as to permit its use under ambient conditions ranging from sunlight to total darkness. The digital data read block 78 senses the digital information which is photographically stored on the prerecorded film and converts it for transfer via the input/output interface connection 68 to the microprocessor 40. The power stage, illustrated at 80, converts the standardized power input at the input/output interface 68 to any appropriate operating voltage/power level required by the loader device 56.

In operation of the display/memory/control system, turning "on" of the power supply 50 causes a "read-only-memory" (ROM) section of the memory unit 54 to transmit a signal via the input/output interface 64 and its connector 68 to activate the control 72, the transport drive 74 and the display/store 76 to move and center the first frame of the photographic film adjacent the display aperture window 24 (FIG. 2). A series of optical coding tracks are placed down on the film in an area not observable to the operator (as on an area that would fall above the aperture window, for example), to provide initialization information descriptive of the intended application for coupling back into a "random-access-memory" (RAM) section of the memory 54 in conveying such information as bit transmission rates.

Figure 4:
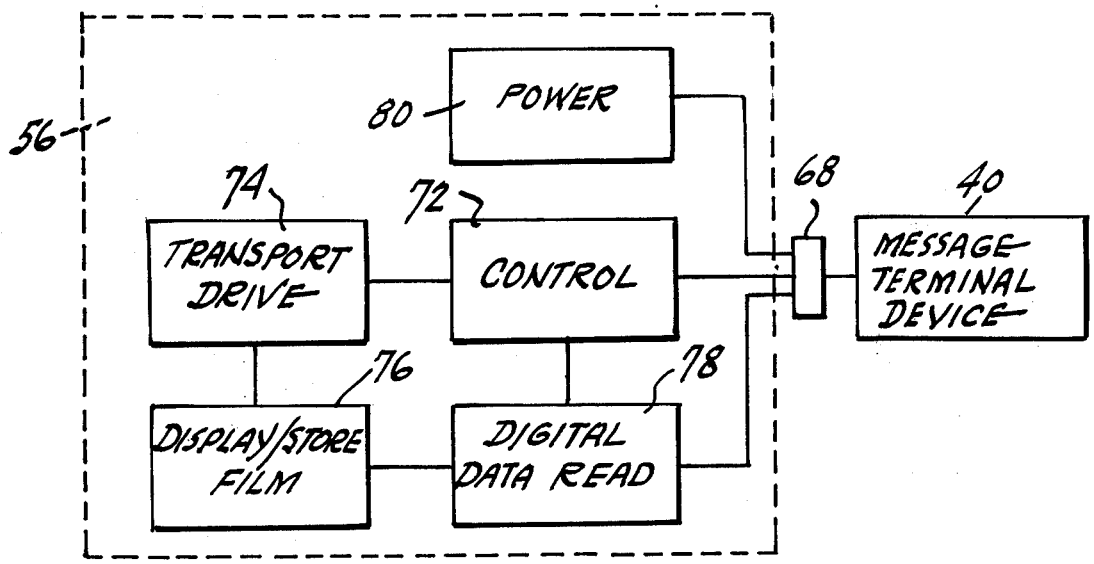
FIG. 4 is a block diagram of the display/memory loader of the invention.

(The digital data read 78 in FIG. 4 corresponds to the light emitter and light sensor arrangements 20, 26 of FIG. 1, comprising, for example, light emitting diodes for the emitters and photodetectors for the sensors. The optical coding tracks comprise light and dark spaces 21 which move between the light emitters and photodetectors in cutting off the light beam to provide electrical signal indications analogous to the coding thereon. As the film transport 74 moves the photographic film past the light emitters and photodetectors, the electrical signals generated by the intermittant breaking and passage of the illumination is coupled via the input/output interface connection 68 to be stored in the RAM section of the memory 54. The light emitters and photodetectors in the digital data read unit 78 are so arranged as to detect a code signal on either side of the first format frame, to indicate the proper centering thereof in the aperture viewer. To this end, a pair of emitter-sensor arrangements 28 are shown in FIG. 2, and are thus effective whether the photographic film moves off from the shaft of motor 12 onto the shaft of motor 14, or vice versa.)

Also coupled into the RAM section of memory 54 is the sequencing information associated with the photographic film cassette employed, to the effect that when a format is selected from the available multiple choices in the first frame, then the appropriate sequencing will follow to display subsequently numbered frames in appropriate manner and order. Thus, if the format identified by the multiple choice letter "F" is selected, then the transport drive 74 will be thereafter activated to display frame numbers 12, 26, 38, etc., for example.

As the transport drive 74 moves the film before the aperture window 24, the light-emitter-photosensor arrangements read the optical code to transmit electrical signals corresponding thereto into an information content to be stored in the RAM unit of the memory 54. When the alphanumeric key is depressed in accordance with the selection made by the forward operator, a control signal is sent from microprocessor 40 to loader 56 to activate the transport drive 74 to move the photographic film until the proper numbered frame is in the view finder 24. As that frame begins to pass through the bank of light emitters and photosensors, the digital signals being read are transferred by the input/output connection 68 and the input/output interface 64 to store such information into the RAM section of memory 54. When the alphanumeric key is once again depressed by the operator to insert the information desired, the answer inserted (or the multiple choice made) is transferred to another section of the RAM unit, along with the information previously read, to be stored, and thereafter transmitted via the communications interface connection 67 when the message is ready for complete transmission. At the same time that the keyboard 58 is activated, the display 60 visually presents the answer selected, or the information inserted, for verification by the operator. In one embodiment of the invention, manual activation by the operator is required in order to couple the information from the loader device 56 into the RAM storage 54, although in other embodiments, the advance of the film and the storage into the memory 54 can be accomplished automatically, after a predetermined time interval has elapsed.

As will be readily apparent, each frame of a format is coded so that the emitter-sensor digital readers can adequately identify when a film frame of proper format is at the viewing aperture. Because the reading into the RAM memory takes place while the filmstrip is moving, precise positioning of the filmstrip in the viewing window is not necessary. As will also be apparent, all that is necessary in order to utilize the display memory control system for diversified applications is to insert a proper film cassette in connection therewith. All apparatus necessary for the reading, storage, and sequencing functions will be the same, such that the microprocessor terminal 40 could be used for a wide variety of applications. When the information is to be transmitted from the RAM memory bank to the central computer, it will be noted that such information can be transmitted either by radio or by cable. It will also be seen that messages can be received from the central station as well, in the same digital format, and coded to activate individual ones or pluralities of message terminal devices—indicating, for example, that selected ones of a plurality of forward observers should change locations to other prescribed points. As will be readily apparent, with the present invention, relatively low cost film could be used as the display and storage medium instead of using an electronic coding system, such as with the light emitting diode or plasma panel displays. With the physical viewing of the described film, no need exists to provide energization to illuminate a display under high ambient lighting conditions, nor is there the need to provide any illumination for nighttime viewing other than through low level back lighting by means of the electroluminescent panel. Because of this, the entire assembly can be manufactured at a fraction of the cost of previously employed digital data systems for forward observer use, and can weight significantly less so as to permit them to be easily carried about. Because of the high risk involved in losing these devices in an enemy tactical environment, the low cost of the unit is particularly important.

While there has been described what is considered to be a preferred embodiment of the present invention, it will be readily understood by those skilled in the art that modifications may be made without departing from the scope of the teachings herein of utilizing a dual motor driven film cassette with a direct view display aperture integrated with an optical film reader matrix and a small active display module for use in rigidly structured information systems. For example, whereas the invention is particularly useful in a forward observer type communications system, its usefulness will be seen to extend to computer based student training systems, as well, where multiple choice questions are put to the student from the prerecorded film strip and where correct answers are programmed by the initialization portion of the prerecorded film.

It will also be apparent that the use of the aforedescribed stepping motors provide advantages other than the elimination of electrical noise. As these motors are addressed by d-c pulses for their operations, they are especially well suited for microprocessor control, wherein the timings may be adjusted to allow for film accelerations and decelerations, all accurately maintained without overshoot, and without the need for complex torque/speed gearing controls which can give rise to acoustical noise.

In similar manner, accurate control of film view positioning is afforded through the use of a pair of light emitter-photodetector banks, operative for film movements in either left-to-right or right-to-left directions. One such bank is actuated for movement in each direction, and serves to enable the transfer of information into memory upon recognition of an appropriate code signal which procedes the message content, terminating the transfer upon the recognition of a second code signal which follows the message. Although the embodiment herein described serves to stop the motor movement upon this second recognition, thereby centering the prerecorded message content in the viewing window at that time, it will be seen that alternative arrangements may be designed in which simultaneous recognition by both banks of directors for these code signals may be employed to sense proper signal transfer and message centering.

For at least the foregoing reasons the extent of the present invention should be determined in accordance with a reading of the claims appended hereto.

What is claimed is:

1. A message terminal device comprising:
   a housing,
   a photographic film strip having a plurality of frames of prerecorded selective alphanumeric messages and coded position indicating markings associated with respective frames having said messages,
   a window in said housing for visually displaying said film strip frames of selective alphanumeric messages,
   means in said housing for holding and transporting said film strip across said window,
   photosensing means in said housing adjacent said film strip for sensing said coded markings of said associated respective frames to control the position of said respective frames having said selective messages at said window,
   first memory means for controlling the sequence of movement of said film in accordance with said coded markings to display said selective alphanumeric messages,
   second memory means for storing information related to said selective alphanumeric messages for subsequent transmission.
   means for manually selecting from said first memory means prerecorded alphanumeric messages to be displayed at said window and for inserting said information related to said selective messages into said second memory means,
   means for displaying alphanumeric information related to said selective messages, and
   means for communicating said stored information to another location.

2. The device of claim 1 wherein said means for holding and transporting said film strip includes a pair of motors, and wherein, when one of said motors provides a drive for said film, the other provides a drag therefor, and vice versa.

3. The device of claim 1 wherein said coded markings are spaced on said film strip from said message groups and from said window.

4. The device of claim 3 wherein pairs of like coded markings for each message group are positioned on opposite sides of each said group on said film strip and said photosensing means includes a plurality of photosensors arranged in like pairs respectively positioned on opposite sides of said window for sensing the presence and sequence of said like coded markings in either direction of film movement.

5. The device of claim 4 wherein said housing includes a display assembly, said assembly including said window and photosensors, and a slot positioned below said window for receiving said film strip.

* * * * *